United States Patent [19]

Johnson

[11] 4,296,301

[45] Oct. 20, 1981

[54] DIE FORMING METHOD AND MACHINE
[76] Inventor: Romain H. Johnson, 925 - 6th St. SE., Minneapolis, Minn. 55414
[21] Appl. No.: 941,385
[22] Filed: Sep. 12, 1978

Related U.S. Application Data

[63] Continuation of Ser. No. 772,433, Feb. 28, 1977, abandoned.
[51] Int. Cl.³ .............................................. B23P 1/00
[52] U.S. Cl. .................................... 219/69 M; 76/4; 219/69 E
[58] Field of Search ............... 219/69 M, 69 Y, 69 E, 219/69 W, 69 R; 51/157; 76/4

[56]  References Cited

U.S. PATENT DOCUMENTS

| | | | |
|---|---|---|---|
| 1,952,152 | 3/1934 | Wilkie | 164/94 |
| 2,800,566 | 7/1957 | Matulaitus | 219/69 E |
| 2,924,701 | 2/1960 | Stamper | 219/69 M |
| 3,058,895 | 10/1962 | Williams | 219/69 E |
| 3,322,929 | 5/1967 | Mayer et al. | 219/69 V |
| 3,809,852 | 5/1974 | Weber | 219/69 V |
| 3,889,092 | 6/1975 | Hessmert | 219/69 E |
| 3,975,608 | 8/1976 | Ullmann et al. | 219/69 M |
| 3,988,863 | 11/1976 | O'Connor | 219/69 V |

FOREIGN PATENT DOCUMENTS

| | | |
|---|---|---|
| 2238698 | 2/1974 | Fed. Rep. of Germany ... 219/69 V |
| 416437 | 4/1961 | Japan . |
| 413594 | 7/1961 | Japan . |
| 45-35115 | 11/1970 | Japan . |
| 46-17679 | 5/1971 | Japan . |
| 49-54998 | 5/1974 | Japan . |
| 51-14840 | 2/1976 | Japan . |
| 52-92492 | 7/1977 | Japan . |
| 53-24200 | 3/1978 | Japan . |
| 53-55597 | 5/1978 | Japan . |
| 53-56797 | 5/1978 | Japan . |
| 53-73438 | 6/1978 | Japan . |
| 53-85597 | 7/1978 | Japan . |
| 53-89096 | 8/1978 | Japan . |
| 53-97698 | 8/1978 | Japan . |
| 150745 | 8/1961 | U.S.S.R. ........................... 219/69 M |

OTHER PUBLICATIONS

Brochure—"ISOCUT–Electro-Discharge Machining System With Three Dimensional Servo-Control", Charmilles Erowa.
Brochure—"A New Dimension in EDM Efficiency–Operational Economy Versatility", Edimax Orbiting Head System, Edimax Inc.
Brochure—"Melting Pointers", Cerro Alloy Dept., Cerro Copper & Brass Co., vol. 4, Spring 1968, #1.
Brochure—"Danly Microme Precision Demountable Guide Posts–U.S. Pat No. 3,219,371", Danly Machine Corp.
R. Buchanan et al., ed., *Tool Design* pp. 128–139, 1943.
Krauter, "EDM & TFM, The Ideal Marriage in a Production of Die Sinking Center", SME Technical Paper, 1976.
"Utilizing EDM Potential in the Small Tool & Die Shop", SME Technical Paper, 1976.
"Sawing Hardened Steel–Omnidirectionally", *Manufacturing Engineering*, 1/1977 pp. 48, 49.
Brochure—"Electrotools, Inc.–Vibrators–Metem Uniaxial Vibrators", Electrotools, Inc.
"Reverse EDM Match Dies", *American Machinist*, 7/31/1967, p. 67.
J. Dillon et al., "Ford Engineers Appraise EDM for Making Body Dies", *Metal Progress*, 10/1967, pp. 199–200.

*Primary Examiner*—C. C. Shaw
*Attorney, Agent, or Firm*—Burd, Bartz & Gutenkauf

[57]  ABSTRACT

A method and machine for forming a complete die such as a stamping die. There is provided a die forming machine having a material erosion machining apparatus with a movable work bed and an extractor, each having means for mounting a work piece. One of the work pieces is a female die blank with a rough-cut die opening. The other is a rough-cut male die punch. The die opening side walls and the rough-cut punch side walls are generally parallel and tapered in the direction of the intended die draft. The die punch blank fits in the rough-cut die opening of the female die blank. The work bed and the extractor are movable away from each other, simultaneously with material removing energy discharge between the bed and the extractor. One work piece is attached to the bed and the other is attached to the extractor and as the bed and the extractor are moved away, the die punch blank is moved through the die opening of the female die blank with the tapered side walls in opposition to the direction of movement. As this passage is made, material is removed from the female die blank and the male die punch to generate the preselected die draft and die clearance. A complete die set is so formed by the method and machine.

15 Claims, 8 Drawing Figures

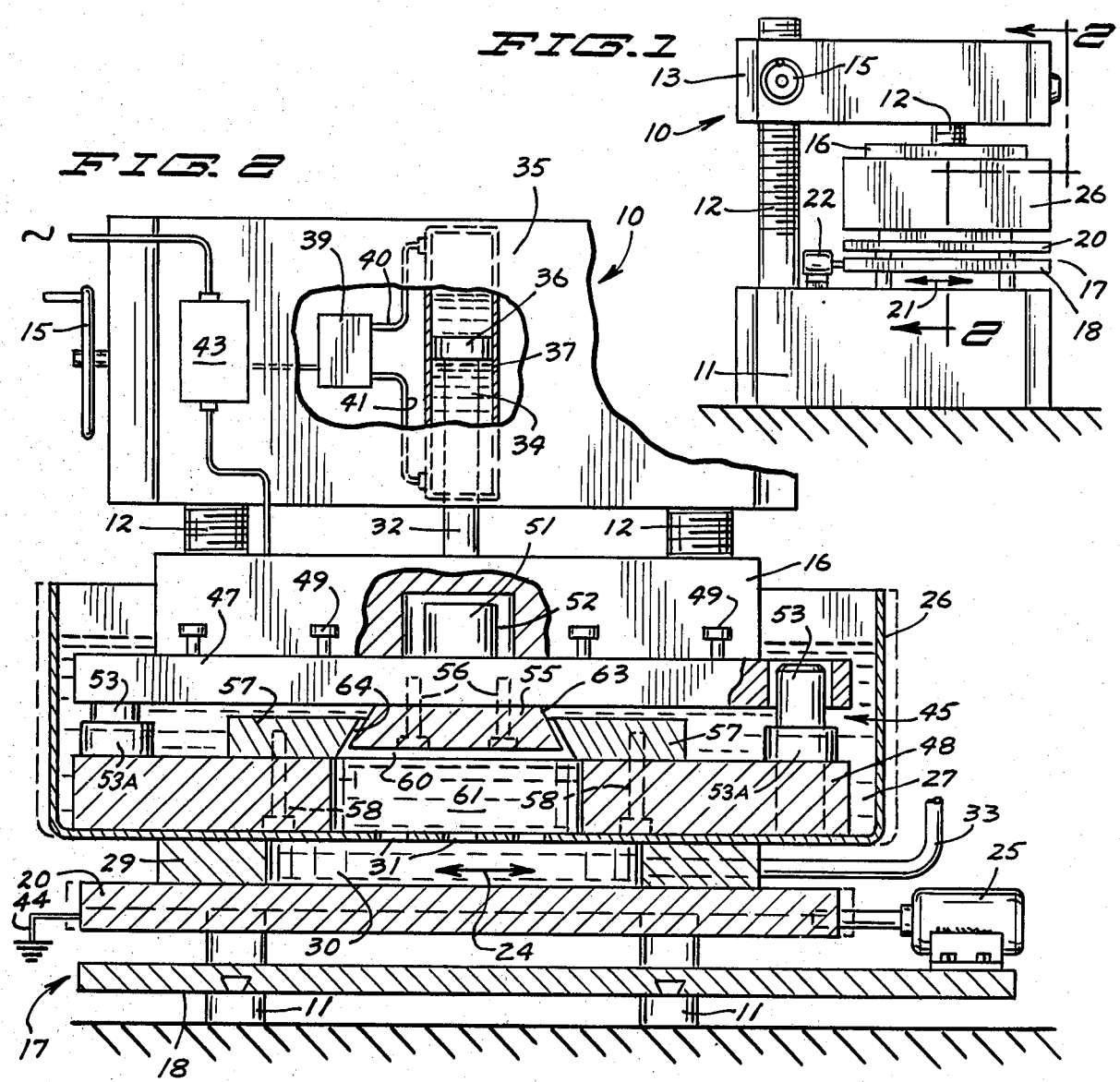
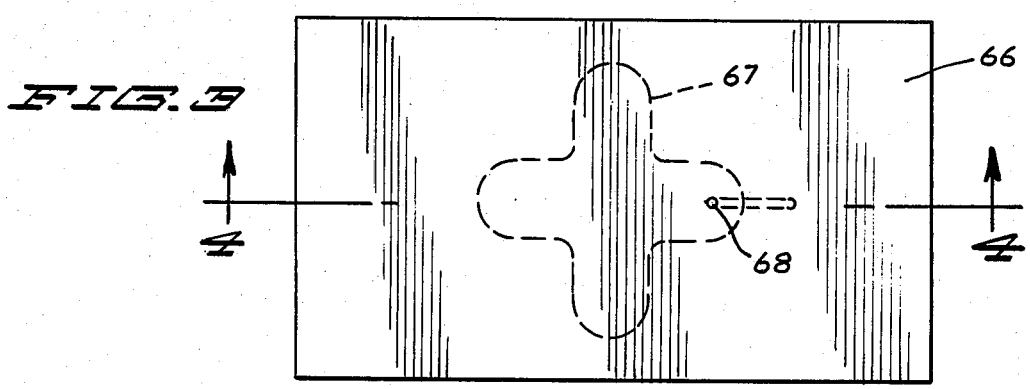
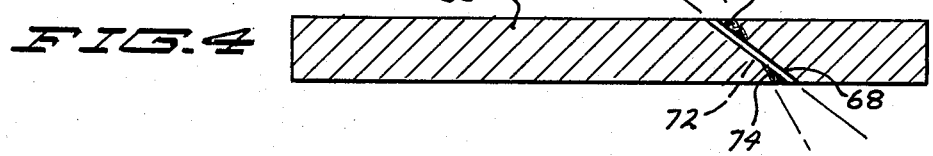

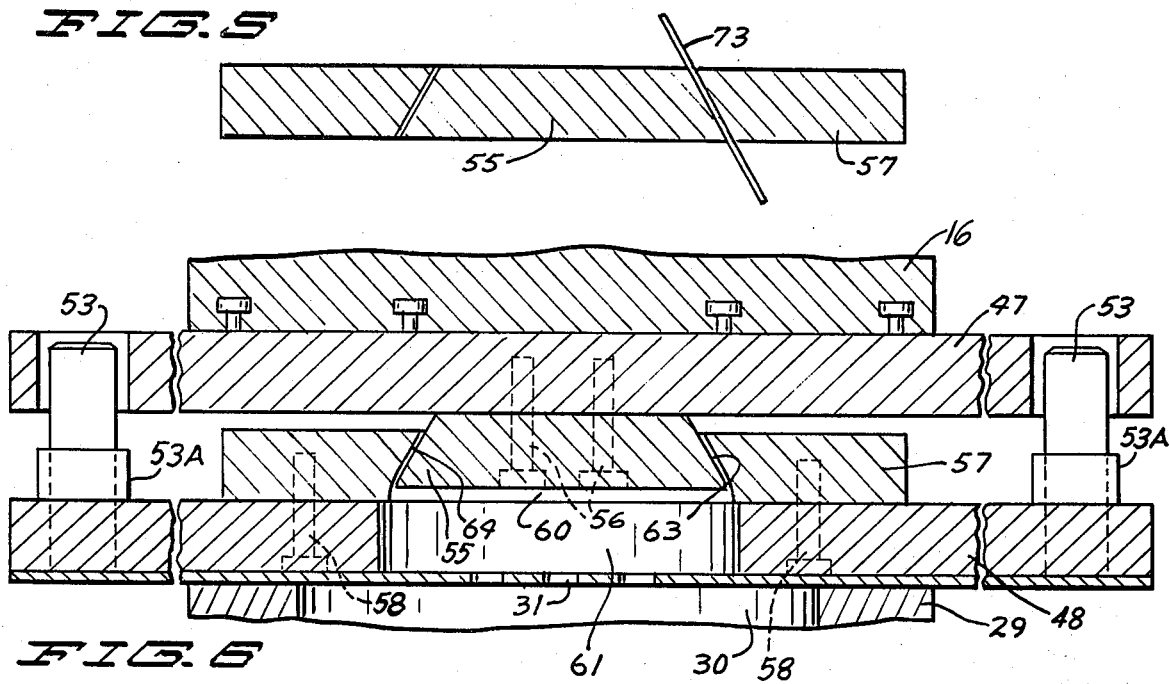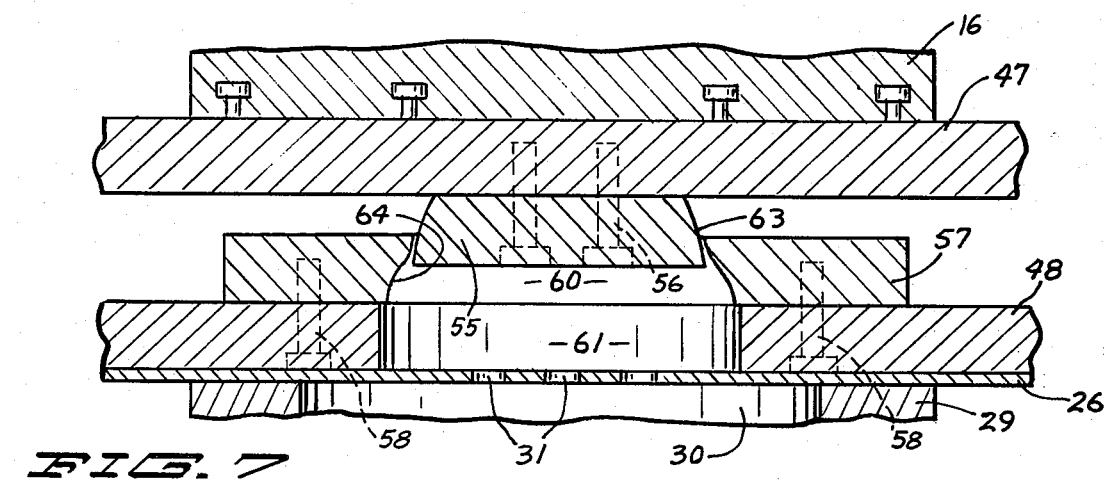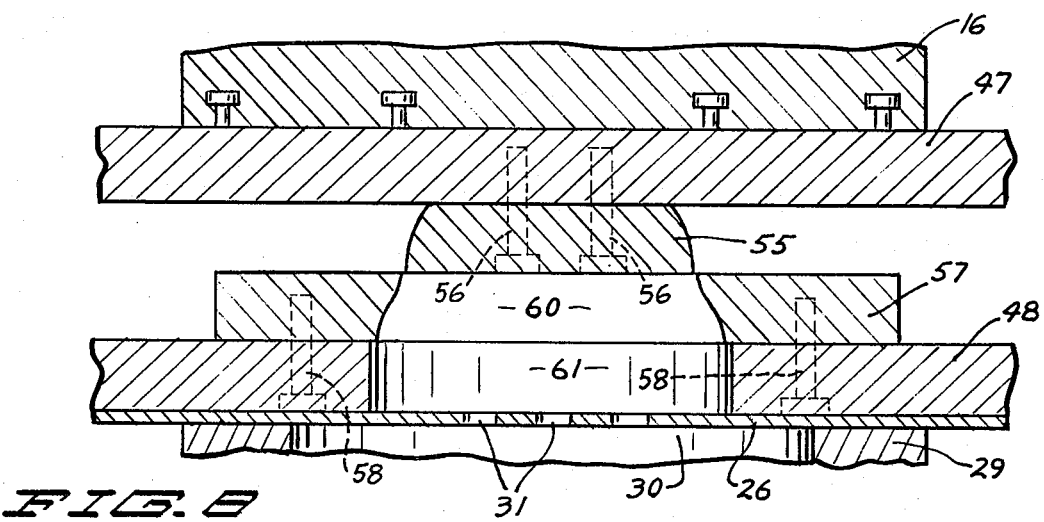

DIE FORMING METHOD AND MACHINE

This application is a continuation of U.S. application Ser. No. 772,433, filed Feb. 28, 1977, now abandoned.

BACKGROUND OF THE INVENTION

According to standard and accepted die making practice, the female die part and the male punch of a complete die are individually machined, heat treated, finished and mounted in a die set. Each complete die has a specified die clearance and draft. The die clearance is the measured space between the mating members of a complete die. For optimum finish of a cut edge of the work part, proper clearance is necessary and is a function of the kind, thickness and temper of the work material. Draft is the amount of taper of the side walls of the female die opening to enable a severed part to be moved through the die without excessive force. Absence of positive draft causes "stacking" or "slug-up" resulting in die failures and excessive press tonnage. Press operators have received personal injury from die failure due to improper die draft. Shattering of punches and splitting of dies to common in the industry and are generally avoided by increased positive draft. However, excess positive draft reduces the economic life of the die. Positive draft occurs when the side walls of the female die opening tape, divergedly from the working face of the female die part where the punch contacts the work material. Negative draft is almost always avoided in the die manufacturing industry.

Once the complete die parts are formed with proper clearance and draft, they are mounted in a die set where it is important that proper registration is achieved. Registration is the relative alignment of the die parts in the die set so that, upon closure of the die set, the die parts will properly come together to maintain the required die clearance.

Due to the foregoing considerations of clearance, draft and registration, die making is a tedious, time-consuming and thus expensive procedure. More inexpensive die making techniques have been developed, but the complete die produced thereby is inferior in quality and generally usable only for short-term runs. For example, a so-called floating punch die is an inexpensive die produced where the punch and the female die part are made from the same piece of tool steel by simply cutting the punch out of the die blank.

Some new, economical die making methods have been developed with the introduction of apparatus for material erosion machining which machine by methods sometimes known as alternative metal removal processes. These include apparatus for electrical discharge machining, electrochemical machining, ultrasonic machining, and lapping. Electrical-discharge machining is based on the principle of erosion of metals by spark discharges. For example, see U.S. Pat. No. 3,604,884 issued Sept. 14, 1971, to Olsson. The spark is a high energy transient electric discharge through the space between two charged electrodes, one of which is a tool and the other a work piece. The discharge occurs when the potential difference between the tool and the work piece is large enough to cause a breakdown in a dielectric fluid medium and to procure an electrically conductive spark channel. As the spacing between the tool and work piece is critical, the feed is generally controlled by servomechanisms.

Apparatus being electrochemical machining process uses a conducting electrolyte which dissolves the reaction products formed on the work piece by electrochemical action and also serves to flush away metallic ions migrating from the work piece. The electrolyte is pumped at high velocities between the forming tool (cathode) and the work piece (anode). A DC power supply maintains very high current densities between the tool and the work piece. For example, see U.S. Pat. No. 3,257,306 to Webb issued June 21, 1966.

An apparatus for ultrasonic machining and lapping employs a process where a tool is given as oscillation, which, in turn, transmits energy to fine abrasive particles that are present between the tool and the work piece. Minute particles of the work piece are eroded away on each stroke. Aluminum oxide, boron carbide, silicon carbide, or diamond particles are typical abrasives used in a slurry, which also carries away the removed debris.

As such apparatus and method are applied to die making, in an electrical-discharge machining apparatus, for example, a die blank is fastened to one shoe of a die set and becomes the work piece. An electrode fashioned in the shape of a punch is fastened to the other shoe and is used to "burn" the die opening in the die blank by bringing an electrode and the bed of the machine together. The die set in use has insulated guide posts. Satisfactory registration can be obtained, however, a negative die draft results, and die clearance is of limited range. Larger clearances and faster removal rates pit the the surface and draw the temper from the tool steel, limiting these methods.

SUMMARY OF INVENTION

The invention relates to a machine and method of producing a complete die from a female die block with a rough-cut die opening, and a rough-cut male die punch block. The male die punch block substantially corresponds in shape to the die opening and can be fitted or assembled in the die opening. Side walls of the die opening and the male die punch block are tapered generally in the direction of an intended die draft. The machine includes a material erosion machining apparatus of the type employing alternative material removal methods. Such apparatus can be comprised as an electronic discharge machine, an electrochemical machining apparatus or an abrasive machining apparatus. The apparatus has a work table or work bed and an extractor, each having means to hold a work piece. Means are provided for moving the extractor away from the work bed while providing material erosion energy discharge between them. The female die block comprises one work piece and the male die punch block comprises the other. The male die punch block is placed in assembled relationship to the female die block and one is assembled to the work bed while the other is assembled to the extractor. The tapered side walls of the die opening and the male die punch block are orientated in such a relationship as to be in opposition to movement of the extractor away from the work bed. Under material removing energy discharge, the male punch block is drawn through the female die opening against the taper of the side walls whereby material is removed from the side walls of both the female die opening and the male die punch block. The amount of material removed is pre-selected according to the intended die clearance and die draft. Lateral motions can be introduced by servomechanisms to reduce production time, improve the finish, and control die clearance and draft. These motions are integrated with the extractor motion. When the operation, according to a preferred embodiment, is accomplished with the male die punch block and the female die block assembled in shoes of a die set, proper die registration, die clearance, die draft, and surface quality and texture are achieved by automatic servo-system. The system is such that one operator may tend several machines.

IN THE DRAWINGS

FIG. 1 is a side elevational view of one form of a die forming machine according to the present invention;

FIG. 2 is an enlarged front view of the die forming machine of FIG. 1 partly in section, taken along the line 2—2 of FIG. 1;

FIG. 3 is a top plan view of a blank for forming an intended die blank;

FIG. 4 is a sectional view of the blank of FIG. 3 taken along the line 4—4 thereof;

FIG. 5 is a sectional view of a rough cut die blank showing the rough cut female part and the rough cut male die punch part in assembled relationship;

FIG. 6 is an enlarged view of a portion of the machine of FIG. 2 showing commencement of a die forming procedure;

FIG. 7 is a view of the machine as shown in FIG. 6 but showing the die forming procedure at an intermediate stage; and FIG. 8 is a view of the machine of FIGS. 6 and 7 but showing the die forming procedure at completion.

DESCRIPTION OF A PREFERRED EMBODIMENT

Referring to the drawings, there is shown in FIGS. 1 and 2 a die forming machine indicated generally at 10, according to one form of the present invention. Machine 10 has a generally C-shaped frame which includes a base 11, vertical stanchions or support columns 12, and a head 13. The vertical position of head 13 is roughly adjustable relative to base 11 on support columns 12 by suitable adjusting means. As shown, the upper portions of support columns 12 are threaded and engage threaded collars (not shown) or the like within head 13 which are rotated by manipulation of control wheel 15 to raise or lower head 13 for rough adjustment. Other adjustment means known in the art can be used.

Machine 10 includes a material erosion machining apparatus shown in the form of the invention illustrated as an electronic discharge machining apparatus. Machine 10 could as well include other forms of material erosion machining apparatus which is used to generically include also ultrasonic machining and lapping apparatus and electrochemical machining apparatus. The electronic discharge machining apparatus includes an extractor plate 16 mounted on head 13 and a workbed or workable assembly 17 mounted on the base 11 of machine 10.

Worktable assembly 17 includes means for imparting motion in a horizontal plane or X-Y motion to a work piece mounted thereon and includes a first table 18 movably mounted on base 11 and a second table 20 movably mounted on the first table 18. First table 18 is movably mounted on base 11 for movement in a first or X direction in a horizontal plane indicated by the arrow 21 in FIG. 1, by suitable means as being mounted on machine ways or the like. Movement back and forth in the X direction of first table 18 is accomplished by a first sevro-unit or vibrator mechanism 22 mounted on the base 11 and connected to the first table 18. Second table 20, as shown in FIG. 2, is movably mounted on the first table 18 for movement in a second direction in a horizontal plane perpendicular to the direction of movement of table 18, or for movement in a Y direction as indicated by arrow 24. Back and forth movement of the second table 20 in the Y direction is controlled by a second servo-unit or vibrator mechanism 25. As the operation of electronic discharge machining is delicate, the use of servo-units 22 and 25 controlled by suitable servomechanisms regulate movement of the work piece and tool is commonplace and known in the art. Servo-units 22 and 25, operating in conjunction with extractor 16 and electrical discharge regulating equipment, move the work piece and the tool according to a pre-selected pattern in order to achieve proper die draft, die clearance, and surface finish. Servo-units 22, 25 can be electric, hydraulic, or of other suitable types.

A tank 26 is mounted on the second table 20 and contains a dielectric fluid 27, such as oils or deionized fluids, as is necessary in electronic discharge machining. A vertical wall 29 disposed between the tank 26 and the second table 20 forms a chamber 30 through which dielectric fluid 27 can flow through openings or ports 31 for recirculation. The vertical wall 29 can be located within the tank 26, but is shown outside for clarity. The ports 31 can be sealed or open, as required by the openings in lower shoe 48. A tube 33 draws dielectric fluid from the chamber 30 for filtering and recirculation to the interior of tank 26 by suitable means (not shown).

Extractor 16 is mounted on head 13 for movement away from worktable assembly 17 in a Z direction mutually perpendicular to the Z and Y motions of worktable assembly 17. Extractor plate 16 is fixed to a shaft 32 connected to the output rod 34 of a double-acting hydraulic cylinder assembly 35 mounted in head 13. Rod 34 is connected to a piston 36 in a cylinder 37. Hydraulic fluid is derived from a hydraulic fluid source 39 which provides hydraulic fluid to the cylinder 37 through lines 40, 41 to raise and lower the piston 36 and thus extractor plate 16. Hydraulic fluid source 39 is connected to the servomechanism controls (not shown). Servo-units 22, 25 and hydraulic cylinder assembly 35 all operate in coordination according to a predetermined and preselected machining plan, resulting in the aforesaid X, Y, and Z relative motions of the worktable assembly 17 relative to extractor 16. Suitable controls responsive to punched tapes or computer data can be used to control the servo-units 22 and 25 and the operation of cylinder assembly 35 as is known in the art. A common digital mode of operation is orbital motion of the worktable assembly 17 in the X—Y horizontal plane.

Electrical power is applied to extractor plate 16 from a suitable electrical power supply indicated at 43 with worktable assembly 17 grounded to base 11 as indicated at 44 in FIG. 2.

A die set assembly 45 assembled in machine 10 includes an upper die shoe 47 and a lower die shoe 48. Upper die shoe 47 is mounted to the lower surface of extractor plate 16 as by having suitable T-shaped fittings in engagement with T-slots 49 in extractor plate 16. Die shoe 47 is of the type having a shank 51 for mounting in a die press, the shank 51 being accommodated in an opening 52 in extractor plate 16. Lower die shoe 48 is mounted to the worktable assembly 17 as by being secured at the bottom of tank 26. Other usual or preferred means of mounting the die shoes to machine 10 can be used. For example, magnetic chucking devices can be contained within extractor 16 and beneath lower die shoe 48.

Die set assembly 45 also includes guide posts 53 of the usual type for connection and guided movement of the upper and lower die shoes during a die punching procedure. Guide post bushings 63A which would usually be present during a die punching procedure are removed or lowered after die set assembly 45 is mounted to permit X-Y movement between the upper and lower die shoes 47 and 48 during the electrical discharge machining procedure of forming a die. Alternatively, a die set assembly having removable guide posts can be used on ball bushing die sets. Removing the ball cage electrically isolates the upper shoe 47 and allows X-Y motions to generate die clearance.

Upper die shoe 47 carries a rough-cut male die punch 55 secured thereto by bolts 56 and comprising a first machining work piece mounted with respect to the extractor plate 16. As shown, male die punch 55 functions as a cathode in an electrical discharge machining procedure, although it could as well function as an anode.

Lower die shoe 48 carries a rough-cut female die blank 57 secured thereon by bolts 58. Female die blank 57 has a rough-cut die opening 60 disposed over a die shoe opening 61 and is comprised as a second machining work piece mounted with respect to the worktable assembly 17.

Female die block 57 and male die punch 55 together form a rough-cut complete die with the male die punch 55 conforming substantially to the shape of the die opening so as to be able to be assembled therein. Male die punch block 55 has tapered side walls 63, and female die block 57 likewise has tapered side walls 64 defining the rough-cut die opening 60. Male die punch block 55 can be assembled as shown in the die opening 60 with the side walls 63 parallel to the side walls 64 of female die block 57 with the taper of the side walls orientated in opposition to movement of the extractor plate 16 away from the worktable assembly 17. This movement of the extractor place 16 away from the worktable assembly 17 closes the gap between male die punch block 55 and female die block 57 such that machining discharges take place on the tapered side walls 63, 64. The movement of male die punch 55 is in the direction of convergence of side walls 63, 64. The direction of taper of the side walls is the same direction but steeper than the angle of the intended taper of the positive die draft of the complete die when finished.

Male die punch 55 and female die block 57 can be separately machined to fit together as shown in FIG. 2, or they can be cut from a single blank as shown in FIGS. 3 and 4. A die blank 66 of suitable metal or other die forming material has shown in phantom at 67 the outline of the shape of the intended rough-cut die punch. A hole 68 is formed through the die blank 66 at an inclination greater than the intended side wall taper of the completed rough-cut die, which is indicated by the axis 69 in FIG. 4. This increment of inclination is indicated by the arrow 70 in FIG. 4. Hole 68 passes through the width of blank 66 and, at the approximate midportion thereof, intersects an imaginery downward projection of the phantom outline 67 of the intended punch shape, the intersection point being indicated at 72 in FIG. 4. A suitable linear elongate cutting tool 73 is inserted through the hole 68. Cutting implement 73 is worked to a position in alignment with the axis 69 and then moved through the blank 66 to cut out the rough-cut die punch 67 as shown in FIG. 5. Cutting implements in common usage include the abrasive wire, wire electrical discharge machining, and the band saw blade. Other cutting methods include energy beams, fluid and abrasive jets, plasma techniques, chemical and ionizing jets, and combinations of these.

In movement of the cutting implement from a position in the hole 68 to a position in alignment with the axis 69, some damage occurs to die blank 66 as indicated by the stippled areas 74, 75 in FIG. 4. The intended working surface of the male die punch is at the bottom surface of blank 66 as viewed in FIG. 4, and the working edge of the female die block is the top edge of the cut. Therefore, the damage at areas 74, 75 is of no consequence in the final die forming procedure.

Having so formed a rough-cut male die punch and a rough-cut female die block, either by means indicated herein or other suitable means, the work pieces are assembled in machine 10 as shown in FIG. 2, with the male die punch fitted in the die opening 60 of the female die block 57. The tapered side walls 63, 64 converge in a direction in opposition to or in normally impeding relationship to movement of the extractor plate 16 away from worktable assembly 17. For some applications, die set 45 will not be required, and male die punch 55 and female die block 57 will be mounted directly to table 20 and extractor 16.

The method of forming the finished complete die is illustrated by FIGS. 2 and 6-8. The male die punch 55 is positioned in the described machining apparatus to remove material from the side walls 64 which form die opening 60, at the same time as material is removed from the male die punch 55 side wall 63 to generate proper die draft and clearance. During the machining procedure, hydraulic cylinder assembly 35 moves the male die punch 55 in an upward, or in the Z direction while the servo-units 22, 25 impart X—Y movement or movement in a horizontal plane, to the female die block 57 to generate the proper die clearance according to a pre-selected machining plan programmed into the controls for servo-units 22 and 25. More specifically, referring to FIG. 6, an electrical discharge machining voltage is applied to male die punch 55 creating an electronic envelope of high current density to break down the electrical discharge machining fluid and result in a material removing spark discharge between the side wall surface 63, 64. Material is removed from both work pieces as male die punch 55 advances from a position of FIG. 6 to a position of FIG. 7 where it can be seen that proper die draft on the side wall surfaces 64 defining die opening 60 is being formed. As the male die punch 55 moves in the up or Z direction, female die block 57 is moved in the X—Y plane to remove material and generate additional die clearance according to the predetermined machining plan. For narrow dies and certain other die applications, movement only in the Z direction will be sufficient and the electronic envelope surrounding the male die punch 55 will generate adequate die clearance. Material removed is flushed through openings 31 of tank 26 in the dielectrical fluid and is subsequently filtered out before the fluid is recirculated to the tank 26.

Male die punch 55 continues to advance from the position of FIG. 7 to the position of FIG. 8 to complete the die forming procedure. The rate of material removal during the procedure depends mostly upon the average current in the electrical discharge circuit. In general, the higher material removal rate produces a rougher surface. During the initial electrical discharge machining procedure, as when going from the position of FIG. 6 to that of FIG. 7, a surface finish is not critical and the machining process may proceed more rapidly. During the final stages of machining, the machining rate is slowed to produce a fine surface near the upper edge of the female die block 57 defining die opening 60, and near the lower edge of male die punch 55, which are the edges that stamp out or form finished parts.

The positions of female die block 57 and male die punch 55 can be reversed in the machine 10 to form compound-type dies and other designs common to the tool-making trade.

After completion of the procedure, the die set guide post bushings are reassembled, or the guide posts are replaced if they have been removed. The complete die mounted in the die set is ready for use. Registration or alignment is correct as the die was formed while mounted in the die set. The die has positive die draft. Die clearance is correct and is held to a close tolerance by the servomechanisms of the machine.

While there has been shown and described a machine utilizing an electrical discharge machining apparatus, it is apparent that other forms of material erosion machining apparatus could be used, including electrochemical machining apparatus and ultrasonic machining apparatus. Furthermore, it is apparent that X—Y movement or rotary movement in a vertical plane could be imparted to either the male die punch or the female die block during the die forming process, and that movement in the Z direction could be imparted to either work piece as well. In addition, if desired, rather than using the male die punch 55 as an electrode, an electrode can be fastened to the end of the male die punch conforming to the shape thereof, for use in the material removing procedure to obtain the correct die opening. Depending upon the design of the die, either male die punch block 55 or female die blank 57 can be laminated with other conductive material, such as graphite or copper, for special purposes such as elimination of burning of the punch or female die. Additionally, it may be seen that a plurality of complete dies can be formed at the same time on a single machine. Other variations will be apparent to those skilled in the art without departing from the scope and spirit of the invention.

The embodiments of the invention in which an exclusive property or privilege is claimed are defined as follows:

1. The method of forming a complete die from a blank and a die set having an upper shoe, a lower shoe, and guide means mounting the upper shoe on the lower shoe whereby the upper shoe can be moved toward and away from the lower shoe in a linear direction comprising the steps of:

severing a single blank to form a rough-cut female die block having an opening therethrough whereby the portion of the blank defined within the opening forms a rough-cut male die punch block complementary thereto and peripherally spaced from the female block when centered therein, said severing forming adjacent rough-cut side walls on said female die block opening and said male punch block that are substantially parallel at any point therearound and tapered convergingly in the direction of intended die draft to define respectively smaller and larger openings on said female block and end surfaces on said male block on either side thereof with the larger end surface of said male block greater in size than the smaller opening of the female block, said taper of the rough-cut walls being greater than the taper of the intended die draft, securing said male block to an upper die set shoe with the larger end surface of the block spaced downwardly therefrom, securing said female die block to a lower die set shoe with the smaller block opening spaced upwardly therefrom and said female block in surrounding relation to said male block, aligning said die set shoes with said guide means for vertical relative movement in said linear direction so as to center the male block within the female block opening and with said male and female block walls in laterally spaced relation, securing said upper die set shoe to an extractor, securing said lower die shoe to a bed, and, moving the male punch block and female die block relative to each other in a direction in opposition to the taper of the side walls of the punch block and die opening while simultaneously effecting material-removing erosion between the male die punch block and the female die block to generate preselected die clearance and die draft.

2. The method of claim 1 including: the further step of moving the female block in a direction generally normal to the direction of movement of the male block during drawing thereof.

3. The method of claim 1 including: the further step of providing relative motion between the female block and male die punch block in a direction generally normal to the direction of the relative movement between the female block and male block during drawing thereof.

4. The method of claim 1 including: the further step of moving the lower die shoe in a direction other than the linear direction during the relative movement between the male punch block and female die block.

5. The method of claim 1 including: the further step of moving one of the die shoes in a direction other than the linear direction during the relative movement between the male punch block and female die block.

6. A die formed according to the method of claim 1.

7. A die constructed according to the method of claim 1 comprising: a female die block having a die opening, a male die punch block corresponding in shape to the die opening in the female die block, said male die punch block and die opening in the female die punch block having adjacent side surfaces substantially parallel to each other and convergingly tapered in the direction corresponding to the taper of the die draft, a first die shoe attached to the male die punch block, a second die shoe attached to the female die block, and locating means cooperating with the first die shoe and second die shoe adapted to position the female die block in proper die set alignment with the male die punch block with the male die punch block in registration with the opening in the female die block and locating the respective side surfaces thereof in spaced relationship, said locating means including a plurality of axial registration pins.

8. The structure for forming a complete die comprising:

a rough-cut female die block having a rough-cut die opening, a rough-cut male die punch block corresponding in shape to the die opening in the female die block, said punch block being the plug formed in making the rough-cut die opening in said female block, said male die punch block and die opening in the female die block having adjacent rough-cut side walls substantially parallel to each other and convergingly tapered in a direction corresponding to the taper of the intended die draft of the complete die to define respective smaller and larger end surfaces on said male block and the opening in said female block, said taper of the rough-cut side walls being greater than the taper of the intended die draft, a bed and an extractor mounted above the bed, a first die set shoe holding the male die punch block, said first die shoe being attached to the extractor, a second die shoe holding the female die block, means for mounting the second die shoe on said bed, said first and second die shoes having cooperating die locating means including a plurality of axial registering pins and openings axially aligned with the pins adapted to receive bushings to movably mount the first shoe on the second shoe for locating the male die punch block in registration with the female die block with the respective side walls thereof in laterally spaced relationship and with the converging taper of the side walls in position to block separation movement of the extractor and bed, means for providing relative movement between the extractor and bed in the axial direction of the pins, and means for material-removing erosion cooperatively associated with said male and female blocks and operable to form the complete die side walls of the female and male blocks, said erosion means operable simultaneously with the relative movement of the male die punch block out of the opening of the female die block to move material from between the side walls of the female die block opening and the male die punch block to generate an intended die clearance and die draft.

9. The structure of claim 8 including: means for moving one of the die shoes in a direction other than the direction of movement of the extractor to provide relative motion between the male die punch block and female die block to control the intended die clearance.

10. The structure of claim 8 including: means for moving the second die shoe in a direction other than the direction of movement of the extractor to provide relative motion between the male die punch block and female die block to control the intended die clearance.

11. The structure of claim 8 including: means for moving at least one of the die shoes in a direction other than the axial direction of the pins to control the intended die clearance.

12. The structure of claim 8 wherein: said means mounting said second die shoe on said bed includes a movable table, and means controllably moving said table in a plane normal to the relative movement between the extractor and bed.

13. The structure of claim 8 wherein: said material-removing erosion means is an electric discharge machine including an electrode connected to the male block, a power supply connected to the electrode, power control means for regulating the power supplied to the electrode, control means for said extractor, control means for said table, and machine control means for coordinating the power control means, extractor and table control means in a predetermined manner during erosion removal of material from said blocks.

14. The structure of claim 13 wherein: said means for material-removing erosion is an electrical discharge machine including an electrode connected to the male block, an electrode connected to the female block, a tank containing a liquid, with said female block being disposed in said tank and in said liquid.

15. The structure of claim 8 wherein: said material-removing erosion means is an electrical discharge machine including an electrode connected to the male block, a power supply connected to the electrode, and power control means for regulating the power supply to the electrode.

* * * * *

UNITED STATES PATENT AND TRADEMARK OFFICE
CERTIFICATE OF CORRECTION

PATENT NO. : 4,296,301
DATED : October 20, 1981
INVENTOR(S) : Romain H. Johnson

It is certified that error appears in the above-identified patent and that said Letters Patent are hereby corrected as shown below:

Column 1, line 24, "to" should be -- are --.

Column 1, line 28, "tape," should be -- taper --.

Column 2, line 1, "being" should be -- using --.

Column 2, line 20, "method" should be -- methods --.

Column 3, line 58, "workable" should be -- worktable --.

Column 5, line 9, "63A" should be -- 53A --.

Signed and Sealed this

Second Day of November 1982

[SEAL]

Attest:

GERALD J. MOSSINGHOFF

*Attesting Officer*  *Commissioner of Patents and Trademarks*